July 10, 1934.   O. E. ANDRUS   1,966,231
PIPE JOINT
Filed Jan. 11, 1932
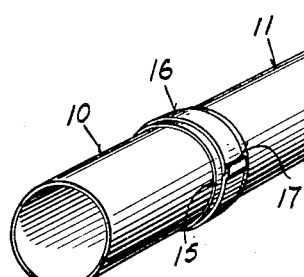
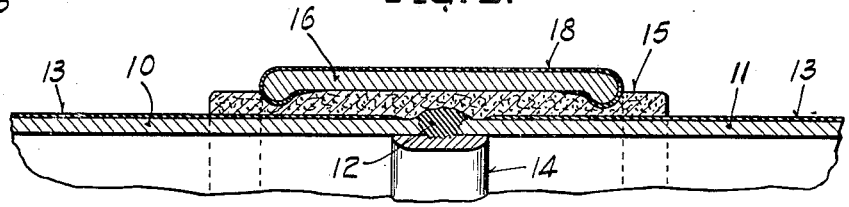
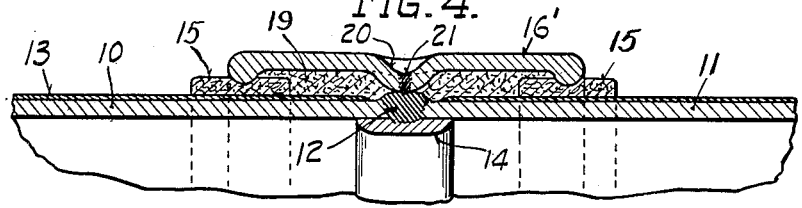
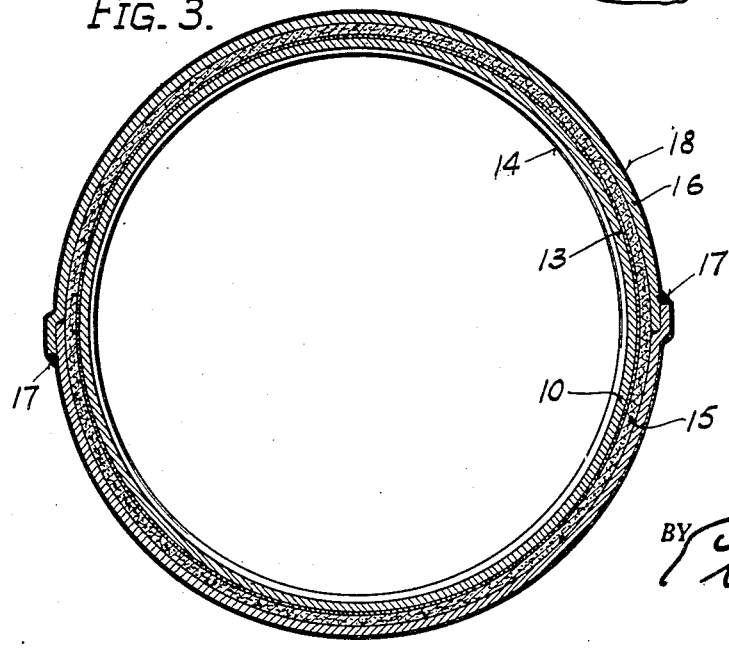
INVENTOR.
Orrin E. Andrus
BY
ATTORNEY.

Patented July 10, 1934

1,966,231

UNITED STATES PATENT OFFICE 1,966,231

PIPE JOINT

Orrin E. Andrus, Milwaukee, Wis., assignor to A. O. Smith Corporation, Milwaukee, Wis., a corporation of New York Application January 11, 1932, Serial No. 585,867

10 Claims. (Cl. 285—114)

This invention relates to a pipe joint for connecting adjacent sections of a pipe line and particularly to the protection of the joint against corrosion.

Considerable capital has been invested in a network of underground pipe lines which extends throughout the country and serves to transport fluids such as oil and gas from the field to the refinery or consumer as the case may be. The life of this network of pipe lines is limited by the corrosive action of the soil in which it is placed.

The problem of soil corrosion is one which has attracted considerable thought and attention, and many proposals have been made for preventing or reducing this type of corrosion. The expedient most commonly used is to provide the pipe with a coating or covering of corrosion resistant material, which will retard or prevent corrosion of the pipe.

More recently it has been proposed to protect the pipe by a coating of vitreous enamel which is applied in the factory in which the pipe is made. This coating provides an effective means for protecting the pipe in all types of soils, for long periods of time. With this new type of coating it is desirable to provide a practical and economical means for covering the joints made in the field.

The principal object of the present invention is to protect the circumferential joints of an enameled pipe line against the corrosive action of the soil in which it is laid so that the life of the joint will be comparable to the life of the vitreous enamel covered pipe sections.

Various other objects of the invention will become apparent from the following detailed description taken in connection with the accompanying drawing, in which:

Figure 1 is a perspective view of a pipe line having joints protected in accordance with the present invention;

Fig. 2 is a longitudinal sectional view through the joint showing the means for protecting the weld against the corrosive action of the soil;

Fig. 3 is a transverse sectional view; and

Fig. 4 is a longitudinal section showing a modification.

In the present invention the welded joint connecting the pipe sections is protected against corrosion and is thereby strengthened by enveloping the joint in a coating of corrosion resistant material such as asphalt or other plastic or mastic materials. This material is in turn covered with a metallic sleeve which prevents the soil and the corrosive constituents thereof from coming into contact with the corrosion resistant material and protects the material against the mechanical and chemical action of the soil.

While the above mentioned plastic materials such as asphalt and coal tar products, cement, and mastic materials such as sand, asphalt and coal tar mixtures provide good initial protection, their life is comparatively short and their effectiveness in resisting corrosion rapidly diminishes if placed in direct contact with the soil. The mechanical movement of the soil with respect to the pipe resulting from expansion and contraction of the pipe by temperature changes and the settling of the soil in the refilled trench in which the pipe is laid causes a tearing and wearing of the coating and the exposure of the pipe to the corrosive constituents of the soil. In addition to this action the soil tends to absorb the corrosion resistant constituents of the coating. The rock and shale furthermore becomes embedded in the coating and permits the moisture and corrosive constituents of the soil to seep through between the embedded materials and coating and attack the metal of the pipe. The metallic sleeve having the ends sealed to exclude moisture of the soil performs an important function in prolonging the life of the joint.

Referring now to the drawing, the numerals 10 and 11 denote adjacent ends of pipe sections which are united by a weld joint 12 which may be made by any suitable and well known process such as by gas welding, arc deposit or other types of electric welding. The outer surfaces of the pipe sections 10 and 11 are provided with an enamel coating 13 which extends to within a short distance of the weld 12. The welding of the abutting ends causes enamel immediately adjacent thereto to be removed and for this reason it is important to provide some means for protecting this portion of the pipe against corrosion.

The weld may be constructed in any desired manner. As shown, a ring 14 having a curved inner surface is provided, which extends internally of the pipe beneath the weld and functions to center the ends of the pipe sections for welding and forms a backing strip on which the first layer of metal is deposited. As will be noted, the top of the weld 12 extends some distance above the outer surface of the pipe sections 10 and 11 so as to form an outwardly extending bead which functions to hold the corrosion resistant material and sleeve in position over the weld.

The weld 12 and the portion of the pipe immediately adjacent thereto is wrapped with a suitable fabric 15 such as asbestos impregnated with a suitable corrosion resistant material such as asphalt. It is not the intention to limit the invention to the above mentioned corrosion resistant material, as any type of material such as cement, plastic or mastic materials capable of excluding moisture may be employed as a filler with or without the fabric.

Extending around the pipe and covering the fabric 15, is a metallic sleeve 16 which functions to maintain the corrosion resistant material 15 out of contact with the soil for the purposes before described. Any suitable mechanical means may be provided for securing the sleeve 16 in position. As shown in Fig. 3, the sleeve comprises a split clamp the end edges of which are overlapped and welded as at 17. The side edges of the ring clamp are preferably extended inwardly to a slight extent and are embedded in the corrosion resistant material 15 an acts as a seal to exclude the moisture of the soil from within the sleeve and also to prevent extrusion of the filler material by the clamping pressure of the sleeve. The outer surface of the sleeve may be provided with an enamel coating 18, a non-corrosive metallic coating, or the sleeve may be of suitable corrosion resistant alloy.

In the modification shown in Fig. 4 the corrosion resistant material 19 is poured or molded about the weld and strips of asphalt impregnated material 15' are wound about the enamel pipe to which strips the side edges of the sleeve 16' are embedded. In this modification additional means is shown for preventing longitudinal movement of the sleeve and filler with respect to the joint. As shown, the sleeve 16' is provided with indentations 20 which contact with the weld 12 and are spot welded thereto as at 21. This feature of welding the sleeve to the pipe to prevent the longitudinal displacement of the sleeve is not limited to this modification, but may also be used in the form shown in Fig. 2 if so desired.

Although the invention has been shown and described in connection with circumferential joints of an enamel coated pipe line, it will be apparent that the protective means provided may be applied to any circumferential portion of the pipe in which a part or all of the enamel has been removed or in which the enamel is defective.

Having thus described the invention, it is understood that various modifications may be made without departing from the spirit of the invention.

I claim:

1. A joint for connecting adjacent sections of a pipe line which comprises means uniting the ends of adjacent pipe sections, a fabric sleeve impregnated with corrosion resistant material covering said means, a metallic sleeve having an outer corrosion resistant surface covering said fabric sleeve, and inwardly extending side edge portions on said metallic sleeve adapted to be embedded in said fabric sleeve.

2. A joint for connecting sections of a vitreous enamel covered pipe line comprising a welded portion connecting the ends of adjacent pipe sections, a sleeve of corrosion resistant material covering said welded portion and the adjacent enameled covered portion of the pipe sections, and a metallic sleeve having a corrosion resistant outer surface covering said corrosion resistant material and having the side edge portions thereof in pressure engagement with said corrosion resistant sleeve.

3. A joint connecting the adjacent sections of a vitreous enamel covered pipe line comprising a welded portion connecting the pipe sections end to end, said welded portion extending outwardly from the surface of the pipe sections to form an outwardly extending circumferential bead, a cementitious corrosion resistant material covering said welded portion and the adjacent enamel covered end portions of the pipe, said bead preventing the longitudinal movement of said material with respect to the pipe, and a metallic sleeve having a corrosion resistant outer surface in pressure contact with said material.

4. A joint of the class described comprising a welded portion uniting the adjacent ends of coated pipe sections, a ring disposed within the pipe and beneath the welded portion, corrosion resistant material covering said welded portion and adjacent coated end portions of the pipe, and a metallic sleeve clamped to said corrosion resistant material, said metallic sleeve comprising half sections having the end edges held in clamping relation.

5. A joint for connecting pipe sections comprising a circumferential weld uniting the pipe sections, a covering of a corrosion resistant material capable of being applied tightly around the weld, a metallic sleeve having inwardly extending end portions for engaging the covering, the end portions of the sleeve serving to press the covering tightly against the pipe sections to make a water-tight joint when the sleeve is drawn into position, and welds connecting the sleeve to the weld uniting the pipe sections to retain it and the covering in position.

6. In combination with an underground metallic pipe line coated with vitreous enamel, means for protecting bare portions of the pipe, comprising a corrosion resistant impregnated fabric covering the bare portion and adjacent enamel, and a metallic covering binding said fabric to the pipe and protecting it from abrasion of the soil.

7. In combination with an underground metallic pipe line coated with vitreous enamel, means for protecting bare portions of the pipe, comprising a corrosion resistant material extending over the bare portion and adjacent enamel, and a metallic covering welded to the pipe for binding said material to the pipe and protecting it from abrasion of the soil.

8. In a joint for underground metallic pipe lines coated with vitreous enamel, a circumferential weld joining pipe sections end to end, a corrosion resistant impregnated fabric covering the weld and adjacent enamel, and a metallic covering binding said fabric to the pipe and protecting it from the abrasion of the soil.

9. In a joint for underground metallic pipe lines coated with vitreous enamel, a circumferential weld joining pipe sections end to end, a corrosion resistant material covering the weld and adjacent enamel, a metallic sleeve covering said material to bind it to the pipe and protect it from abrasion of the soil, and a weld joining said sleeve to the pipe to prevent displacement of the sleeve.

10. In a joint for underground metallic pipe lines coated with vitreous enamel and having a circumferential weld joining pipe sections end to end with end portions of the pipe adjacent the weld free of enamel, means for protecting such exposed metal from corrosion comprising, a corrosion resistant preformed covering extending over the exposed metal and adjacent enamel, and a metallic sleeve binding said covering to the pipe and protecting it from the abrasion of the soil.

ORRIN E. ANDRUS.